United States Patent [19]

Gray et al.

[11] 3,771,278
[45] Nov. 13, 1973

[54] FITTING AND METHOD FOR FILLING OR EVACUATING A CONTAINER
[75] Inventors: James G. Gray, Ferguson; Kenneth E. Sontag, St. Louis, both of Mo.
[73] Assignee: McDonnell Douglas Corporation, St. Louis, Mo.
[22] Filed: Aug. 2, 1972
[21] Appl. No.: 277,394

[52] U.S. Cl............................ 53/7, 29/516, 53/22 R, 53/88, 53/112 R, 220/2.2, 285/156, 285/382.2
[51] Int. Cl............................................. B65b 31/04
[58] Field of Search..................... 53/7, 12, 22 R, 79, 53/88, 97, 112 R; 285/382.2, 156, DIG. 2; 220/2.2; 29/516

[56] References Cited
UNITED STATES PATENTS
2,897,642   8/1959   Jones et al................................. 53/7
2,121,558   6/1938   Coe et al...................... 285/382.2 X Primary Examiner—Travis S. McGehee
Attorney—Edward A. Boeschenstein et al.

[57] ABSTRACT

A container having a communication tube extended from it is easily and quickly filled or evacuated through a fitting which is swaged over the tube. Once the container is filled or evacuated, the fitting is swaged over the tube at a second location to seal the tube. The fitting has a barrel which is closed at one end and is further provided with a main bore which opens out of the other end and receives the tube. The mid-portion of the barrel is enlarged and a cross bore opens into the main bore at this enlarged mid-portion. Initially, the portion of the barrel between the enlarged mid-portion and the open end is swaged over the tube. Then the container is filled or evacuated through the cross bore which communicates with the interior or the container through the unswaged portion of the main bore and the tube. Thereafter, the portion of the barrel between the closed end and the enlarged mid-portion is swaged over the tube to seal the end of the tube. Finally, the cross bore is closed to provide seal redundancy.

11 Claims, 4 Drawing Figures

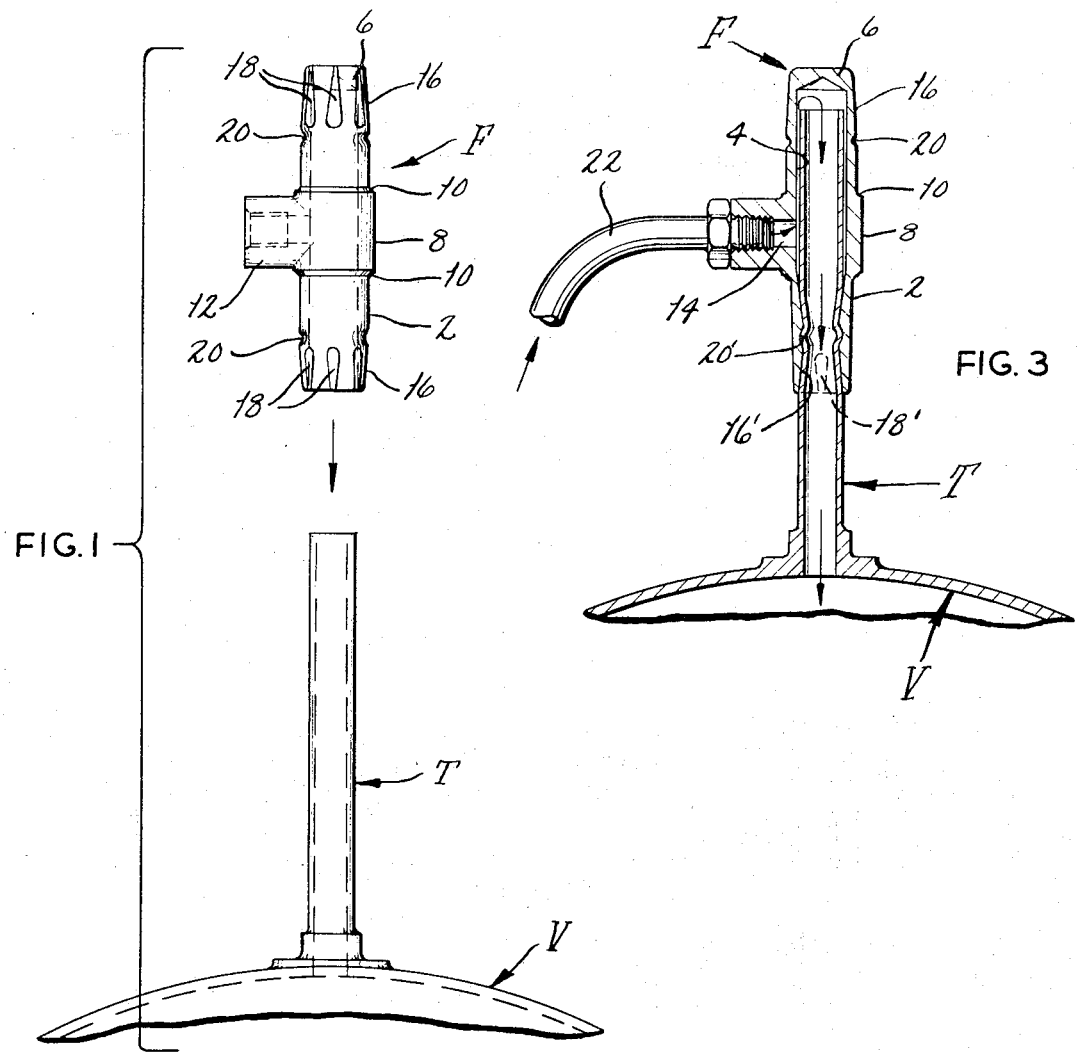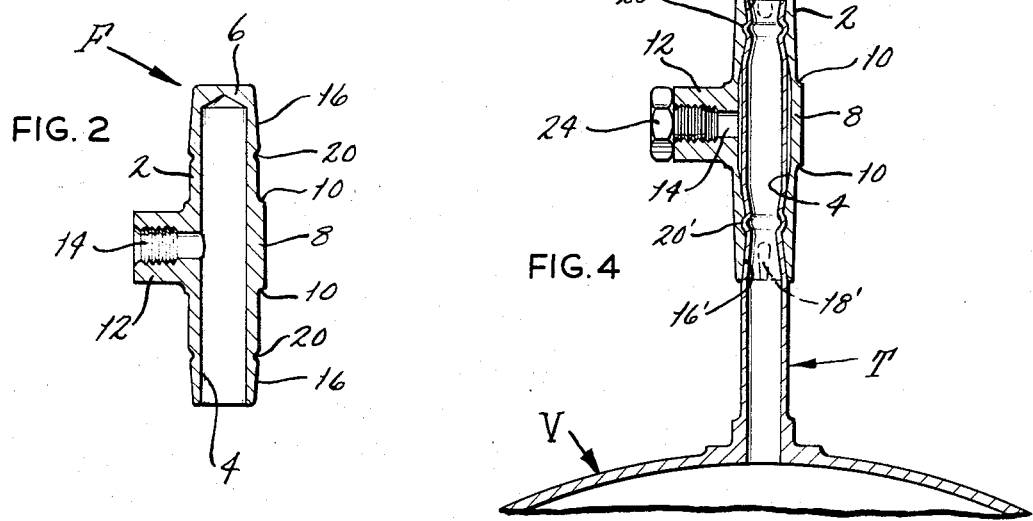

FITTING AND METHOD FOR FILLING OR EVACUATING A CONTAINER

BACKGROUND OF THE INVENTION

This invention relates in general to pressure fittings and, more particularly, to a fitting for closing the ends of a tube communicating with a container, the closure formed thereby, and a method of filling or evacuating a container with a fitting.

Sealed and pressurized containers are utilized in many varieties of machinery such as aircraft, refrigeration systems, hydraulic and pneumatic suspension systems, and fire protection systems, to name a few. These are in many instances charged or evacuated through tube-like ports which must thereafter be sealed with some sort of closure fitting to prevent the loss of fluid and pressure or loss of vacuum, as the case may be.

The methods heretofore employed for securing the fitting to the tube have not been entirely satisfactory. For example, welding or brazing requires the application of heat and this in turn weakens the metal. Moreover, welding and brazing are extremely hazardous where the pressurized fluid which is sealed in the vessel is inflammable. In addition, welding is not suitable where the closure fitting and the port to be closed are formed from different metals.

Apart from the foregoing, the sealing procedures currently employed require specialized equipment which is generally not suitable for use in the field. Furthermore, the equipment requires special skills to operate.

SUMMARY OF THE INVENTION

One of the principal objects of the present invention is to provide a fitting for sealing a communication tube to a pressure or vacuum container. Another object is to provide a method of filling or evacuating containers with such fittings. A further object is to provide a fitting of the type stated which need not be the same metal as the communication tube and is installed on the tube without the application of heat. An additional object is to provide a fitting of the type stated which is permanently swaged in place and provides redundant sealing capabilities. Still another object is to provide a seal fitting of the type stated which may be installed in the field with a portable swaging unit.

The present invention is embodied in a fitting and process for filling or evacuating a container through a communication tube thereon. The fitting has a main bore in which the tube is received and a passageway which opens into the main bore. The fitting is swaged to the tube between the passageway and the open end of the main bore and then fluid is introduced into or evacuated from the tube through the passageway. Thereafter, the fitting is swaged tightly against the tube on the other side of the passageway, forming a fluid-tight seal therewith. The invention also consists in the parts and in the arrangements and combinations of parts hereinafter described and claimed.

DESCRIPTION OF THE DRAWINGS

In the accompanying drawings which form part of the specification and wherein like numerals and letters refer to like parts wherever they occur:

FIG. 1 is an exploded elevational view showing a container and a fitting for filling or evacuating and thereafter sealing the communication tube extended from the container;

FIG. 2 is a longitudinal sectional view of the fitting;

FIG. 3 is a sectional view in elevation showing the fitting used to introduce fluid into or evacuate fluid from the tube and container; and FIG. 4 is a sectional view in elevation showing the fitting sealing the tube extended from the container.

DETAILED DESCRIPTION

Referring now to the drawings, F designates a closure fitting for sealing a tube stub T extended from a pressure or vacuum vessel V. The tube stub T is in effect a short length of tubing, the interior of which opens into the interior of the vessel V, and hence may be called a communication tube. Initially, the sidewalls of the tube stub T are cylindrical.

The fitting F possesses a T-shaped configuration and includes (FIGS. 1 and 2) an elongated barrel 2 having an initially cylindrical main bore 4 (FIG. 2) extending almost entirely through it. The bore 4 is sized to receive the tube stub T with the fit being such that a pressurized fluid will flow with relative ease between the outer surface of the tube stub T and the wall defining the bore 4. In other words, a slight clearance exists between the tube stub T and the wall of the bore 4. One end of the bore 4 is closed by an end wall 6 which forms an integral part of the barrel 2, while the other end is, of course, open for reception of the tube stub T.

Midway between its end the barrel is enlarged in the provision of an enlarged center section 8 having shoulders 10 at each end thereof. The enlarged center section 8 further merges into a generally cylindrical boss 12 having a passageway or cross bore 14 extending axially through it. The inner end of the cross bore 14 opens into the main bore 4 of the barrel 2. The outer end of the cross bore 14 (FIG. 2) opens outwardly and is internally threaded although the boss 12 can be provided with external threads or other types of connections. The barrel 2, center portion 8, and boss 12 are all formed integral with one another, preferably by forging.

Initially the exterior surface of the barrel 2 beyond the center section 8 possesses a non-cylindrical configuration so that when it is swaged the irregular surface contours will be transposed to the surface of the main bore 4. More specifically, the endmost portions of the barrel 2 are slightly tapered, thus forming external tapered surfaces 16 having their narrowest diameters at the extreme ends of the barrel 2. These tapered surfaces 16 are interrupted with circumferentially spaced flats 18 (FIG. 1). Adjacent to the shoulders 10 at the ends of the enlarged center portion 8 the barrel 2 possesses a cylindrical configuration. Finally, between its cylindrical and tapered surfaces 16 the barrel 2 is necked inwardly to form annular grooves 20.

To fill or evacuate the vessel V through the tube stub T projecting therefrom, the fitting F is placed over the tube stub T so that the tube stub T is received in the bore 4 of the barrel 2 and is extended substantially all the way to the end wall 6 but with clearance to allow fluid flow around the end of the tube stub T. Hence, the two annular grooves 18 in the barrel 2 will encircle the tube stub T. Thereupon, the portion of the barrel 2 located between enlarged center portion 8 and the open end of the bore 4 is swaged inwardly into a generally cylindrical configuration of slightly reduced diameter (FIG. 3). The swaging deforms the barrel 2 against the tube stub T so that the barrel 2 tightly embraces the tube stub T. Indeed, the swaging not only deforms the barrel 2, but also deforms the tube stub T. Moreover, the swaging in effect transposes the exterior configuration of the barrel 2 to the interior thereof, that is to the surface of the main bore 4. Hence, after the swaging operation the interface between the bore 4 and the deformed tube stub T embraced thereby includes a tapered portion 16' leading away from the open end of the bore 4, and this tapered portion 16' is interrupted by flats 18' which preclude the fitting F from turning relative to the tube stub T. The interface also includes an inwardly opening groove 20' in the barrel 2 and a corresponding bulge or rib in the tube stub T. This precludes removal of the fitting F from the tube stub T. Apart from precluding rotation and withdrawal of the tube stub T, the swaging further creates a fluid-tight seal between the outer surface of the tube stub T and the portion of the barrel 2 located between the open end of the bore 4 and enlarged center portion 8.

The swaging tool includes a swaging block having a tapered throat which is forced over the barrel 2 from the open end thereof toward the enlarged center section, and this throat is smaller in diameter than the initial diameter of the barrel 2 so as to deform the barrel 2 inwardly to a smaller diameter. The tool also includes an anvil which is positioned against the shoulder 10 at the opposite end of the center section 8, that shoulder 10 being used to locate the tool. The tool is hydraulically operated and is portable. A suitable tool is manufactured by Deutsch, Metal Components Division, 14800 S. Figueroa St., Los Angeles, Calif. Other suitable swaging tools are disclosed in the U.S. patent application of James A. Dawson, Ser. No. 237,990 filed Mar. 24, 1972 and entitled SWAGING TOOL, and the U.S. Pat. application of James A. Dawson, Ser. No. 122,915, filed Mar. 10, 1971, and entitled SWAGING TOOL. Both of the foregoing applications are assigned to the McDonnell Douglas Corporation, of St. Louis, Mo.

After the swaging block 20 is removed from the swaged portion of the barrel 2, the end of a filling hose 22 leading from a pump is threaded into the cross bore 10 of the boss 12 and pressurized fluid is introduced into the fitting T (FIG. 3). This pressurized fluid flows into the cross bore 14 and thence into the main bore 4 of the barrel 2. Actually, the fluid flows into the clearance space existing between the outer surface of the tube stub T and the wall of the bore 4 in the unswaged portion of the barrel 2. From this clearance space the pressurized fluid flows toward the end wall 6 where it reverses direction and enters the interior of the tube stub T. The tube stub T leads into the interior of the vessel V. The vessel V is filled until the fluid within its interior reaches the desired pressure.

To completely seal the tube stub T, the opposite end of the barrel 2, that is the portion between the enlarged center portion 8 and the end wall 6 is swaged inwardly to a reduced diameter in a like manner (FIG. 4). This is achieved by merely reversing the position of the swaging tool on the barrel 2. Thus, as the opposite end of the barrel 2 is swaged, the tapered external surface 16 and flats 18 are in effect transposed to the interior of the barrel 2 to form a tapered surface 16' and flats 18' in the bore 4. Likewise, the annular groove 20 is transposed to the interior of the barrel where it forms an inwardly opening groove 20'. The swaging not only deforms the barrel 2 but also deforms the tube stub T encircled by it so that the external surface of the tube stub T possesses the contour of the inwardly presented surface of the barrel 2. Hence, the tube stub T is deformed into the groove 20'. The end result of the second swaging is a fluid-tight seal between the tube stub T and the portion of the barrel which embraces it, that is the portion of the barrel 2 between the enlarged center portion 8 and the end wall 6.

Thereafter, the end of the hose 22 leading from the pump is unthreaded from the cross bore 14 of the boss 12 and a plug 24 is threaded into that bore to provide seal redundancy (FIG. 4).

The vessel V, of course, may be evacuated in a similar manner.

The installation of the fitting F is effected without applying heat to either the fitting F or the tube stub T and consequently the physical characteristics of the metals are not adversely affected. Also, the fitting T is emplaced with a simple portable swaging tool which is a relatively small device and is easy to operate. Further redundancy is provided in the seal formed by the fitting 12.

If it is desired to refill the vessel V, the tube stub T is merely cut off immediately below the swaged fitting F and another fitting F is installed in a like manner on the remaining portion of the tube stub T, provided of course that enough of the tube stub T remains.

This invention is intended to cover all changes and modifications of the example of the invention herein chosen for purposes of the disclosure which do not constitute departures from the spirit and scope of the invention.

What is claimed is:

1. Means for filling or evacuating a container, said means comprising: a tube extended from the container and having an open end, a fitting having a bore initially sized to loosely receive the tube, the fitting being open at one end of the bore and closed at the other end of the bore and further having a passageway which communicates with the bore intermediate the ends thereof, the tube being received in the bore and a portion of the fitting between the open end thereof and the passageway being swaged onto the tube to effect a seal therewith and to retain the fitting on the tube, whereby fluid can be introduced into or evacuated from the container by way of the passageway which communicates with the container through the bore toward the closed end and thence with the tube.

2. Means according to claim 1 wherein a portion of the fitting between the closed end and the passageway is swageable into the tube to seal the container.

3. Means according to claim 2 wherein the fitting has a barrel through which the bore extends; wherein the barrel is enlarged intermediate its ends; and wherein the passageway opens into the bore at the enlarged portion of the barrel.

4. Means according to claim 3 wherein the swageable portion of the barrel between the closed end and the passageway possesses a non-uniform configuration.

5. Means according to claim 3 wherein the swageable portion of the barrel between the closed end and the passageway includes a groove which encircles the tube and opens outwardly.

6. A closure for the end of the tube which communicates with a container; said closure comprising: a fitting having a barrel provided with a bore in which the tube is received, the fitting being closed at one end of the bore and open at the other end for reception of the tube, the barrel being swaged over the tube at two spaced locations to retain the fitting on the tube and to effect a pair of axially spaced seals with the tube, the fitting further having a passageway which communicates with the bore intermediate the two swaged portions of the barrel.

7. A closure according to claim 6 wherein the passageway is also sealed.

8. A method for filling or evacuating a tube and for thereafter sealing the tube, said method comprising: installing a fitting over the end of the tube, the fitting having a barrel provided with a main bore in which the tube is received and the tube projecting from only one end of the barrel, the opposite end of the barrel being closed whereby the barrel is open at one end and closed at the other end, the fitting further having a passageway which opens into the main bore intermediate the ends of the barrel; creating a seal between the tube and the portion of the barrel located between the open end thereof and the passageway; causing fluid to flow through the passageway so as to fill or evacuate the tube; and swaging the portion of the barrel located between closed end thereof and the passageway against the tube to effect a fluid tight seal between the barrel and tube.

9. A method according to claim 8 wherein the barrel is provided with an annular groove between the closed end thereof and the passageway; and wherein the swaging creates an inwardly opening groove into which the tube is deformed.

10. A method according to claim 9 wherein the barrel of the fitting has another annular groove located between the open end thereof and the passageway; and wherein the seal is created between the tube and the portion of the barrel located between the open end thereof and the passageway by swaging that portion of the barrel such that an inwardly opening annular groove is created with the tube being deformed into the said inwardly opening groove.

11. A method according to claim 10 and further characterized by closing the passageway after the barrel is swaged between the closed end thereof and the passageway.

* * * * *